United States Patent
Saito et al.

(10) Patent No.: US 8,941,803 B2
(45) Date of Patent: Jan. 27, 2015

(54) LIQUID CRYSTAL DISPLAY DEVICE AND ELECTRONIC APPARATUS USING THE SAME

(71) Applicant: NEC LCD Technologies, Ltd., Kanagawa (JP)

(72) Inventors: Soichi Saito, Kanagawa (JP); Shinya Niioka, Kanagawa (JP); Masayuki Jumonji, Kanagawa (JP); Hiroshi Tanabe, Kanagawa (JP); Masamichi Shimoda, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 57 days.

(21) Appl. No.: 13/783,907

(22) Filed: Mar. 4, 2013

(65) Prior Publication Data

US 2013/0182208 A1    Jul. 18, 2013

Related U.S. Application Data

(62) Division of application No. 12/656,721, filed on Feb. 16, 2010, now Pat. No. 8,427,620.

(30) Foreign Application Priority Data

Feb. 16, 2009   (JP) .................................. 2009-32239

(51) Int. Cl.
   *G02F 1/1343*   (2006.01)
   *G02F 1/1362*   (2006.01)
(52) U.S. Cl.
   CPC .... *G02F 1/134363* (2013.01); *G02F 1/136286* (2013.01); *G02F 2001/136295* (2013.01)
   USPC ............................ 349/141; 349/143; 349/113
(58) Field of Classification Search
   USPC ................................................. 349/143, 113
   See application file for complete search history.

(56) References Cited

U.S. PATENT DOCUMENTS 6,208,399 B1   3/2001   Ohta et al.
6,452,656 B2   9/2002   Niwano et al.
(Continued)

FOREIGN PATENT DOCUMENTS

JP   11-119237    4/1994
JP   09-325356    12/1997
(Continued)

OTHER PUBLICATIONS

CN Office Action dated Dec. 30, 2013, with English Translation; Application No. 201010114798.4.
(Continued)

*Primary Examiner* — Kaveh Kianni
(74) *Attorney, Agent, or Firm* — Young & Thompson

(57) ABSTRACT

A liquid crystal display device of IPS mode includes an array of pixels arranged in a matrix pattern by crossing a plurality of video signal lines and a plurality of scanning signal lines each other. Each of the pixels is provided with at least a switching element. A transparent insulating film is provided on both signal lines, and a plurality of pixel electrodes, common electrodes and common lines are provided on the transparent insulating film. The common lines are formed in a grid-shaped pattern such that a first group of the common lines is made of a first conductor having lower reflectivity against optical light than that of metal while a second group of the common lines is made of a second conductor including a metal layer such that said first group and said second group are crossing each other along said video signal lines and said scanning signal lines.

1 Claim, 10 Drawing Sheets

(56) References Cited

U.S. PATENT DOCUMENTS

| | | | |
|---|---|---|---|
| 6,583,840 B1 * | 6/2003 | Inoue et al. | 349/141 |
| 6,686,986 B2 | 2/2004 | Niwano et al. | |
| 6,819,389 B2 * | 11/2004 | Imayama et al. | 349/153 |
| 6,864,939 B2 | 3/2005 | Niwano et al. | |
| 6,950,165 B2 | 9/2005 | Matsumoto et al. | |
| 7,009,664 B2 * | 3/2006 | Imayama et al. | 349/43 |
| 7,110,076 B2 | 9/2006 | Shimizu et al. | |
| 7,295,268 B2 * | 11/2007 | Ono et al. | 349/106 |
| 7,362,401 B2 | 4/2008 | Niwano et al. | |
| 7,859,639 B2 | 12/2010 | Ahn | |
| 8,111,363 B2 | 2/2012 | Ahn | |
| 8,125,609 B2 | 2/2012 | Ahn | |
| 2002/0101557 A1 * | 8/2002 | Ono et al. | 349/143 |
| 2003/0103181 A1 * | 6/2003 | Imayama et al. | 349/122 |
| 2004/0027524 A1 * | 2/2004 | Shiota et al. | 349/129 |
| 2005/0041182 A1 * | 2/2005 | Ono et al. | 349/106 |
| 2005/0062898 A1 * | 3/2005 | Imayama et al. | 349/43 |
| 2005/0280748 A1 * | 12/2005 | Ochiai et al. | 349/43 |
| 2007/0040979 A1 * | 2/2007 | Shiota et al. | 349/141 |
| 2008/0174729 A1 | 7/2008 | Ohta et al. | |
| 2008/0192162 A1 | 8/2008 | Hayakawa et al. | |
| 2010/0259517 A1 | 10/2010 | Tsaur et al. | |

FOREIGN PATENT DOCUMENTS

| | | | | |
|---|---|---|---|---|
| JP | 11-002828 | | 1/1999 | |
| JP | 11-2828 | | 1/1999 | |
| JP | 11002828 A | * | 1/1999 | G02F 1/1343 |
| JP | 11-052428 | | 2/1999 | |
| JP | 2003-295207 | | 10/2003 | |
| JP | 2004-163622 | | 6/2004 | |
| JP | 2005-258408 | | 9/2005 | |
| JP | 2006-184903 | | 7/2006 | |
| WO | WO98/47044 | | 10/1998 | |

OTHER PUBLICATIONS

Japanese Official Action—2009-032239—Oct. 30, 2012.

* cited by examiner

LIQUID CRYSTAL DISPLAY DEVICE AND ELECTRONIC APPARATUS USING THE SAME

This application is based upon and claims the benefit of priority from Japanese patent application No. 2009-032239, filed on Feb. 16, 2009 and the disclosure of which is incorporated herein in its entirety by reference.

TECHNICAL FIELD

The present invention relates to a liquid crystal display (LCD) device and a manufacturing method thereof, and an electronic apparatus using the same, and more particularly to an active matrix type LCD device of a lateral electric field type and a manufacturing method thereof, and the electronic apparatus using the active matrix type LCD device.

BACKGROUND ART

In the active matrix type LCD device using thin film transistors (TFTs) as switching elements, a liquid crystal layer is sandwiched between two transparent substrates, and its display is performed by respectively controlling an electric field applied to the liquid crystal in every pixel arranged in a matrix pattern.

Driving modes of the liquid crystal are roughly divided into two modes. One is a vertical electric field mode and the other is a lateral electric field mode or so called an In Plane Switching (IPS) mode. The vertical electric field mode is a driving mode which drives the liquid crystal by applying a vertical electric field to a principal surface of a glass substrate. The IPS mode drives the liquid crystal by an electric field parallel with the substrates. The IPS mode has an advantage that angle of visibility dependence is small, because only a short axial direction of liquid crystal molecule is observed. The present invention relates to the LCD device of this IPS mode.

In a basic structure of the active matrix type LCD device with the IPS mode, each pixel of a TFT substrate includes a pixel electrode, a common electrode, a TFT, a common line, a video signal line, and a scanning signal line, and they have following functions.

The pixel electrode is applied with a desired electric potential so as to generate the lateral electric field for driving the liquid crystal between the pixel electrode and the common electrode. The common electrode is applied with a reference potential. Each TFT operates as a switch element for connecting/cutting between the video signal line and the pixel electrode. The common line is provided to supply a common potential to the common electrode. The video signal line is provided to supply a video signal voltage to be written in each pixel. The scanning signal line is provided to supply an electric potential to a gate electrode of the TFT so as to control a switching state of on or off of the TFT.

In such IPS mode LCD device, it is important firstly to make the electric potential of the common electrode uniform in order to achieve a stable display for an entire display area. To this end, the resistance of the common line which supplies the electric potential to the common electrode needs to be made low.

Second, it is important for the electric field applied between the common electrode and the pixel electrode so as not to be influenced by potentiodynamic of the video signal line. To this end, a widely used method is that the common line is overlapped on the video signal line with an insulating film interposed between them so as to shield the electric field of the video signal line.

In this method, however, because currents of charge and discharge flow through a parasitic capacitance formed between the video signal line and the common line, its power consumption is increased. In order to suppress the power consumption small, this parasitic capacitance needs to be decreased. For example, the technology which realizes these requests is disclosed in Japanese Patent Application Laid-Open No. 1999-2828 (Patent Document 1: see Paragraphs 30 through 32). This technology will be described with reference to the drawing in the followings.

FIG. 13A is a plan view of a schematic diagram showing a pixel in the technology of the Patent Document 1, and FIG. 13B is a sectional view taken along a dashed line VI-VI shown in FIG. 13A.

The scanning signal line 102 and the video signal line 101 are extending along a horizontal direction and a vertical direction on a drawing sheet of FIG. 13A, respectively, to form a matrix pattern on a TFT substrate. Each TFT 108 is provided at a position corresponding to an intersection of each matrix pattern so that each grid section forms each pixel. One source/drain electrode 110a of the TFT 108 is connected to the video signal line 101, and the other source/drain electrode 110b is connected to the pixel electrode 107. The pixel electrode 107 is formed to have a comb-shaped pattern with its each comb-tooth extending into the pixel area.

As shown in FIG. 13B, a thick transparent insulating film 118 is formed on the video signal line 101 and the pixel electrode 107 (and the scanning signal line 102 which is not shown). The common line 103 in a grid-shaped pattern is formed on the insulating film 118. The common electrode 106 is formed to have a comb-shaped pattern with its each comb-tooth extending into the pixel area such that each comb-tooth is disposed between the pixel electrodes 107 with a predetermined interval. This interval is an aperture on the TFT substrate.

This technology is most notable in the following two points.

First, by forming the common line 103 to have a grid-shaped pattern, its resistance can be reduced more remarkably than the case where the stripe-grid pattern is used. Thus a line width of the common line 103 can be reduced and results in achieving increased aperture ratio. This advantage becomes more remarkable by using a low-resistance metal layer for the wiring. The Patent Document 1 indicates to use one of Al, Cr, Ti, Mo, and a laminated layer of these metals.

Second, by increasing the thickness of the insulating film 118 between the common line 103 and both of the video signal line 101 and the scanning signal line 102, its parasitic capacitance decreases. For this reason, the charge and discharge currents which flow during voltage variation of the video signal line can be reduced. In order to reduce the parasitic capacitance, it is also still effective to make the dielectric constant of the insulating film small, as disclosed in WO 1998-047044 (Patent Document 2: see Page 7, line 37 through page 8, line 3).

However, there is a problem with the LCD device disclosed in the Patent Document 1. When the common line is made of metal layer, its surface reflects an ambient light, and so-called glare occurs. For this reason, a light shielding layer has to be provided on the opposed substrate and when the light shielding layer is provided, its aperture ratio decreases by that amount. In addition, its manufacturing step should allow a margin to the overlapping conformation difference between the TFT substrate and the opposed substrate, and concerning the margin in both of a longitudinal direction (vertical direction) and a transversal direction (horizontal direction), its aperture ratios is further decreased.

SUMMARY

An exemplary object of the invention is to provide a liquid crystal display (LCD) device of an IPS mode without reflection of ambient light and an electronic apparatus using the LCD device, maintaining low-resistance and high aperture ratio of common lines, and a manufacturing method of the LCD device.

An LCD device according to an exemplary aspect of the invention includes a liquid crystal layer sandwiched between a first substrate and a second substrate, and an array of pixels arranged two-dimensionally on the first substrate in a matrix pattern by crossing a plurality of video signal lines and a plurality of scanning signal lines each other. Each of the pixels is provided with at least a switching element. A transparent insulating film is provided on the video signal lines and the scanning signal lines, and a plurality of pixel electrodes, common electrodes and common lines are provided on the transparent insulating film. The common lines are formed in a grid-shaped pattern such that a first group of the common lines extending in one direction is made of a first conductor having lower reflectivity against optical light than that of metal while a second group of the common lines extending in other direction is made of a second conductor including a metal layer such that said first group and said second group are crossing each other along said video signal lines and said scanning signal lines.

A manufacturing method of a liquid crystal display device of a lateral electric field mode includes steps of forming an array of pixels arranged two-dimensionally on a first substrate in a matrix pattern by crossing a plurality of video signal lines and a plurality of scanning signal lines each other, forming a switching element at a corner of each of the pixels; forming a transparent insulating film on the video signal lines and the scanning signal lines; forming a plurality of pixel electrodes, common electrodes and common lines on the transparent insulating film. The common lines are formed in a grid-shaped pattern such that a first group of the common lines extending in one direction is made of a first conductor having lower reflectivity against optical light than that of metal while a second group of the common lines extending in other direction is made of a second conductor including a metal layer such that said first group and said second group are crossing each other along said video signal lines and said scanning signal lines. Then, a liquid crystal layer is sandwiched between a first substrate and a second substrate to form a liquid crystal display device.

BRIEF DESCRIPTION OF THE DRAWINGS

Exemplary features and advantages of the present invention will become apparent from the following detailed description when taken with the accompanying drawings in which.

EXEMPLARY EMBODIMENTS

Exemplary Embodiment 11

Figure 1:
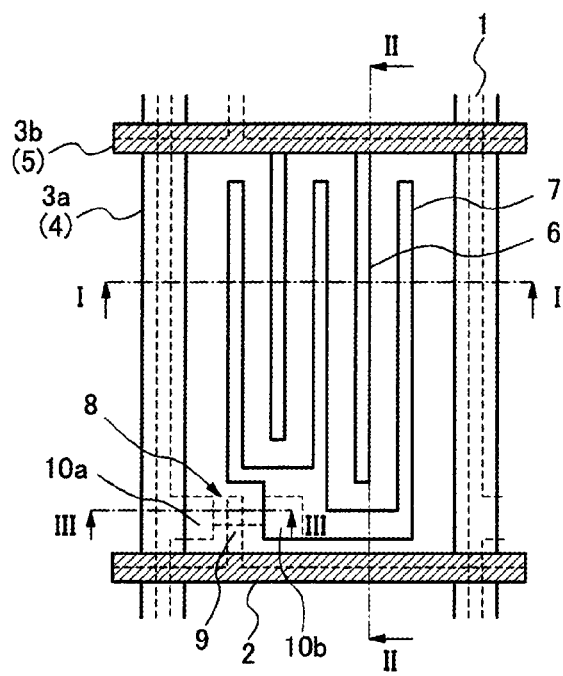
FIG. 1 is a schematic plan view showing a pixel structure according to a first exemplary embodiment of the present invention.

Next, a first exemplary embodiment of the present invention will be described in detail with reference to drawings. FIG. 1 is a schematic plan view showing a pixel structure according to a first exemplary embodiment of the present invention.

A video signal line 1 is extended into one direction (vertical direction) on a substrate (referred to as a first direction here) and a scanning signal line 2 is extended into the other direction (horizontal direction) so as to cross the video signal line on a substrate (referred to as a second direction here). The respective signal lines are made of metal having low electrical resistance such as aluminum. Then grid-shaped common lines 3 (common line 3a and common line 3b) are formed on these signal lines with an interlayer insulating film interposed between them so as to overlap with the two signal lines. The common line 3a and the common line 3b are crossing each other so as to be electrically connected at overlapped areas to form the grid-shaped common lines 3.

Figures 2A, 2B:
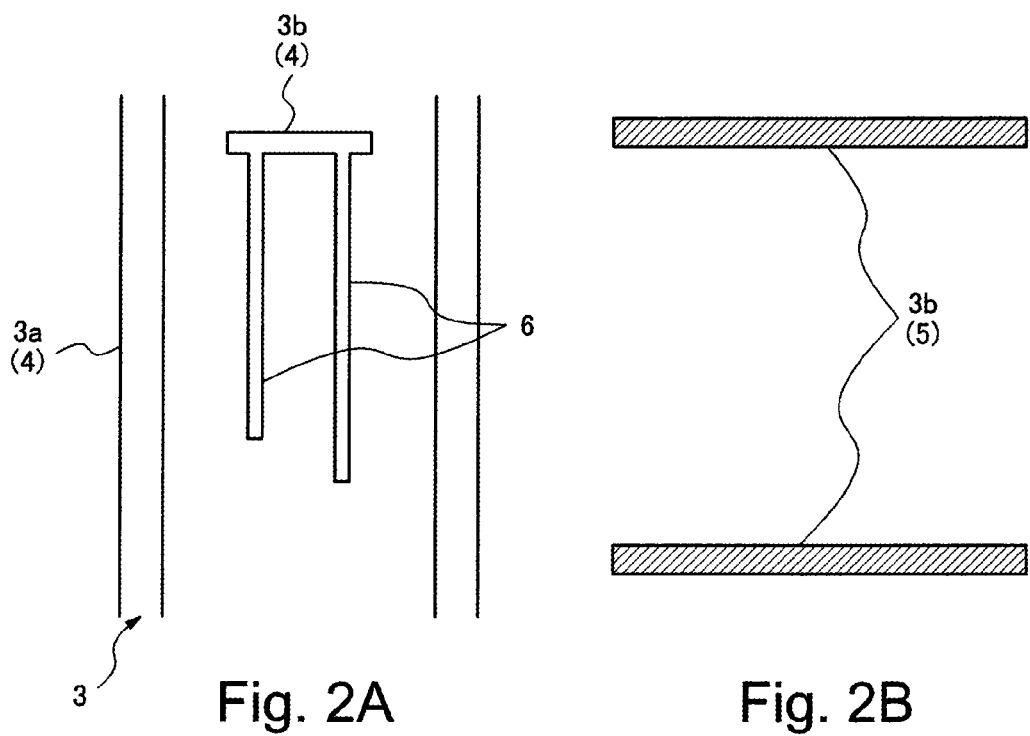
FIG. 2A is a schematic plan view showing an arrangement of a first conductive pattern for a common electrode and a common line according to a first exemplary embodiment of the present invention.
FIG. 2B is a schematic plan view showing an arrangement of a metallic pattern of the common line according to the first exemplary embodiment of the present invention.

A pattern of a common line 3 and a common electrode 6 are shown in FIG. 2A and a pattern of an additional common line 3b is shown in FIG. 2B. The common line 3a extending in one direction is made of a first conductor 4 as shown in FIG. 2A, and the common line 3b extending in the other direction is made of metal layer 5 as shown in FIG. 2B. The first conductor 4 is made of material having lower reflectivity against an optical light than that of the metal layer 5. Its reflectivity should be no more than 20%, and preferably no more than 10%, and it is suitable to use a transparent conductor such as indium tin oxide (ITO) and zinc oxide (ZnO). It is also possible to use a conductive paste which is dispersed with metallic fine particles. As for the metal layer 5, it is preferable to use such material containing aluminum (Al) as a main component, and it is desirable to laminate one of such metals as W, Mo, Ti, Ta, Cr, Ni and these alloys as a barrier metal. The common line 3a extending in a longitudinal direction also acts as common electrode. When the common electrode 6 is formed simultaneously by using the first conductor 4, its manufacturing step can be simplified.

A pixel electrode 7 is formed on a same layer on which the common electrode 6 is formed with a predetermined interval wherefrom. In this exemplary embodiment shown in FIG. 1, although the pixel electrode 7 has three branches while the common electrode 6 has four branches for one pixel, the present invention is not restricted to those numbers. At least one branch of pixel electrode 7 and two branches of the common lines 3a as the common electrodes satisfy the requirements of the present invention. It is also possible that each electrode is provided with bend portion and protruding portion.

A TFT 8 is provided on a corner of the pixel. A gate electrode 9 is provided on a channel portion of the TFT 8 so as to be connected to the scanning signal line 2. One source/drain electrode 10a of the TFT 8 is connected to the video signal line 1, and the other source/drain electrode 10b is connected to the pixel electrode 7.

Figure 3:
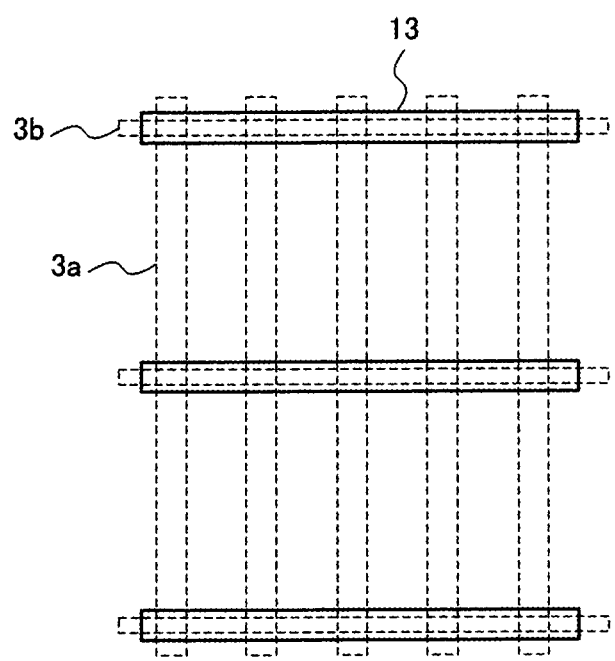
FIG. 3 is a schematic plan view showing a positional relationship between common lines and a black matrix according to the first exemplary embodiment of the present invention.

FIG. 3 is a plan view showing a positional relationship between the common lines 3 formed on a TFT substrate 11 and a black matrix 13 formed on an opposed substrate 12 when superposing the TFT substrate 11 and the opposed substrate 12. The black matrix 13 is formed like a stripe pattern extending in a direction corresponding to the common line 3b made of the metal layer 5 so as to only shade the common line 3b. The black matrix 13 is formed slightly wider than the width of the common line 3b in view of a margin for misalignment between them.

Next, a laminated structure of this exemplary embodiment will be described with reference to the drawings.

Figure 4A:
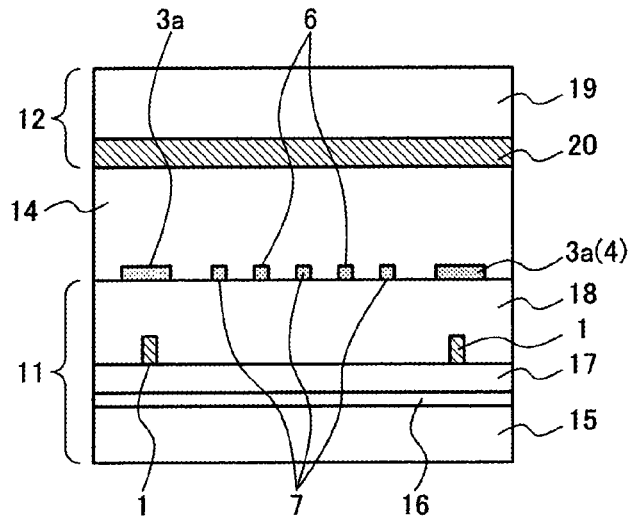
FIG. 4A is a cross sectional view taken along a dashed line I-I shown in FIG. 1.

FIG. 4A is a schematic cross sectional view taken along a dashed line I-I shown in FIG. 1 which indicates the configuration of the LCD device. The LCD device includes the TFT substrate 11, the opposed substrate 12 and a liquid crystal layer 14 sandwiched between them.

In the TFT substrate 11, a gate insulation film 16 is formed on a first glass substrate 15, and a first interlayer insulating film 17 is formed on it, and the video signal line 1 is formed on it. Then the video signal line 1 is covered with a second interlayer insulating film 18.

The second interlayer insulating film 18 is made thicker than other layers and formed to have a flat surface. As an example of its material, it is transparent to optical light and has low dielectric constant, and capable of forming thick and flat film. This is because to increase transmittance of a display panel and to decrease parasitic capacitance formed between the video signal line 1 and both of the scanning signal line 2 and the common line 3.

The common line 3a, the pixel electrode 7 and the common electrode 6 are formed on the second interlayer insulating film 18. The pixel electrode 7 and the common electrode 6 (and the common line 3a) are formed with the predetermined interval alternately. The pixel electrode 7 is applied with a desired electric potential so as to generate the lateral electric field for driving the liquid crystal between the pixel electrode 7 and the common electrode 6.

Side edges of the common line 3a are located close to the pixel electrode 7 than the edge of the video signal line 1 so as to completely cover the video signal line 1 when it is viewed from a side of the opposed substrate 12. Such structure enables to electrically shield the electric field generated from the video signal line 1 against the pixel electrode 7. For this reason, this structure enables to prevent a cross talk which occurs when the display voltage is disturbed by other display voltages for other pixels.

Because an electrical potential of the common line 3 is basically fixed to a predetermined voltage, the liquid crystal on the common line 3 is not driven. When adopting a so-called normally black mode operation, for this reason, the common line 3a also acts as a light shielding layer against the video signal line 1. Because a reflection against a strong ambient light cannot be ignored any more if the common line 3a is made of metal layer, it is important that the reflectivity of the common line 3a is small. Although not being illustrated, an alignment film is formed to cover these members to control alignment directions of molecules of the liquid crystal layer 14.

A color layer 20 for functioning as a color filter on a second glass substrate 19 is formed on the opposed substrate 12. Because the common line 3a plays the role of the light shielding layer as mentioned above, a light shielding layer is not provided on a position corresponding to the video signal line 1 of the opposed substrate 12. The similar effect is also obtained in the case of using so called COT (Color filter On TFT) technology in which the color layer 20 is formed on the TFT substrate 11.

Figure 4B:
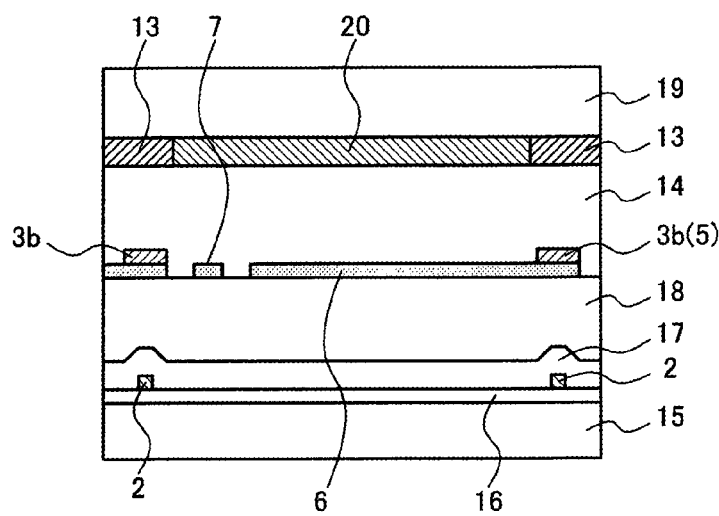
FIG. 4B is a cross sectional view taken along a dashed line II-II shown in FIG. 1.

FIG. 4B is a schematic cross sectional view taken along a dashed line II-II shown in FIG. 1 which indicates a configuration of the LCD device.

The gate insulation film 16 is laminated on the first glass substrate 15, and the scanning signal line 2 is formed on the gate insulation film 16, and next, the first interlayer insulating film 17 and the second interlayer insulating film 18 are formed. The common line 3b, the common electrode 6 and the pixel electrode 7 are formed on the second interlayer insulating film 18. The common line 3b is made of the metal layer 5 and superposes it on the scanning signal line 2. The common electrode 6 is made by extending the first conductor 4 into a pixel area.

As for the opposed substrate 12, the color layer 20 and the black matrix 13 are formed on the second glass substrate 19. The black matrix 13 is provided on a position opposing to the common line 3b. The black matrix 13 is formed wider than the width of the common line 3b by a margin predicted from overlap misalignment between the TFT substrate 11 and the opposed substrate 12. Owing to the black matrix 13, the reflection of the ambient light by the surface of the metal layer 5 for the common line 3b can be prevented.

Figure 4C:
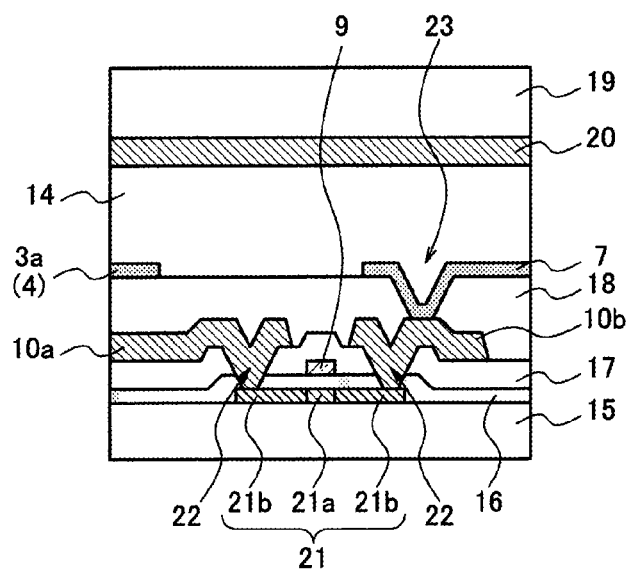
FIG. 4C is a cross sectional view taken along a dashed line III-III shown in FIG. 1.

FIG. 4C is a cross sectional view taken along a dashed line III-III shown in FIG. 1 which indicates a configuration of the LCD device, typically indicates the configuration adjacent to the TFT 8. Although an example of a top gate type is indicated here, the configuration of the TFT 8 is not important basically in the present invention.

An island-shaped semiconductor layer 21 is formed on the first glass substrate 15, and the gate insulation film 16 is formed to cover it, and the gate electrode 9 is formed on it. The source/drain electrode 10 is formed via the first interlayer insulating film 17 on it, and the source/drain electrode 10 and the source/drain region 21b of the semiconductor layer 21 are connected each other through a first contact hole 22. The lower part of the gate electrode 9 is the channel region 21a of the semiconductor layer 21.

The second interlayer insulating film 18 is entirely formed on the source/drain electrode 10. A second contact hole 23 is provided in the second interlayer insulating film 18. One source/drain electrode 10a is connected to the video signal line 1 (not shown), and the other source/drain electrode 10b is connected to the pixel electrode 7 through the second contact hole 23. The color layer 20 is provided on the opposed substrate 12.

Regarding a structure of the TFT 8, as mentioned above, it is not limited to the top gate type, but any type such as a bottom gate type and a fin type is available. As for the semiconductor layer 21, any kind of semiconductor is available such as amorphous silicon, low temperature polysilicon, oxide semiconductor and organic semiconductor. Among these material, because the mobility of electrons or holes of the low temperature polysilicon is higher than that of the amorphous silicon, the low temperature polysilicon has an advantage that a peripheral circuit such as a gate driver, a data driver, a signal processing circuit and a power supply circuit can be made on a same substrate in addition to a display portion. Regarding polarity of the TFT, either n-type or p-type is available.

As described above, according to this exemplary embodiment, it is possible to achieve following advantages simultaneously.
(1) Improved uniformity of the quality of picture owing to stabilized common potential;
(2) Improved aperture ratio owing to that the common line is made fine pattern and the black matrix on the opposite substrate side is extended in only one direction; and
(3) Low power consumption due to decreased parasitic capacitance.

Figure 5A:
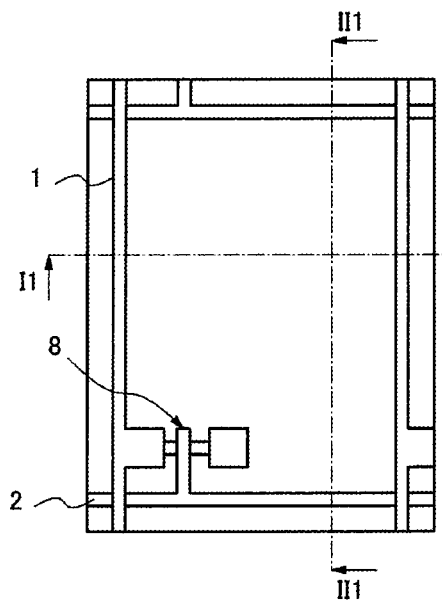
FIG. 5A, FIG. 5B and FIG. 5C are schematic plan views showing steps for a manufacturing method of a TFT substrate according to the first exemplary embodiment of the present invention.
Figure 5B:
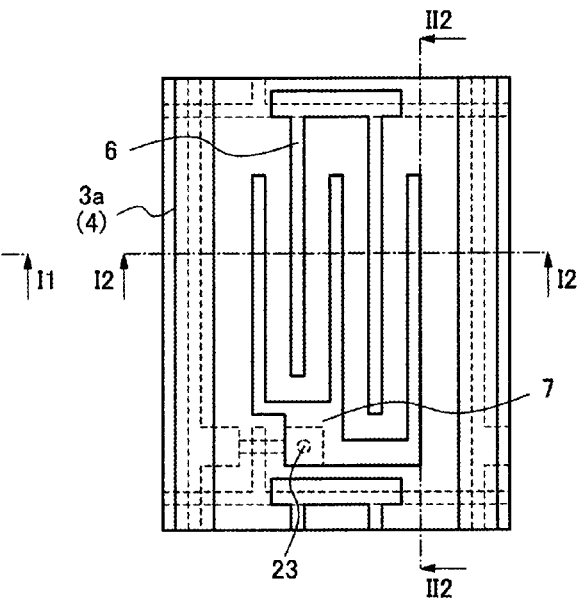
Figure 5C:
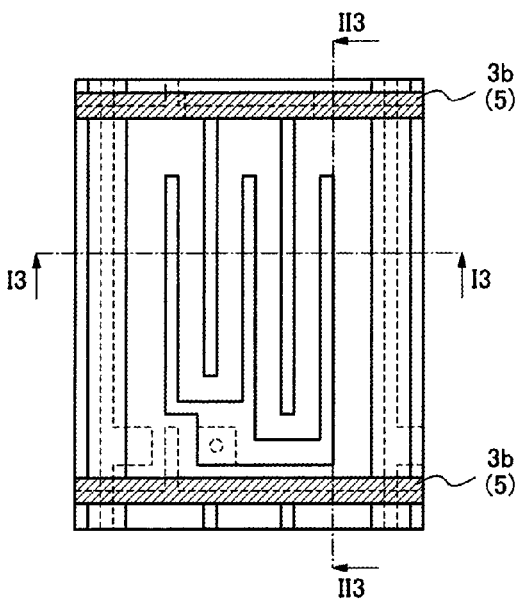

Next, a manufacturing method of this exemplary embodiment will be described. FIG. 5A, FIG. 5B and FIG. 5C are schematic plan views showing steps for a manufacturing method of a TFT substrate.

Figure 6A:
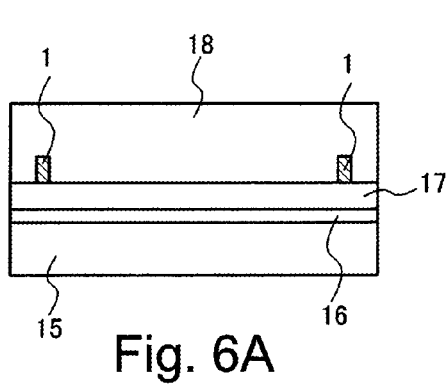
FIG. 6A is a cross sectional view taken along a dashed line I1-I1 shown in FIG. 5A.
Figure 6B:
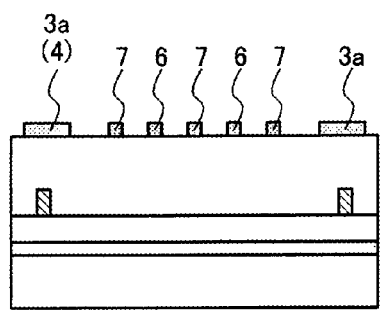
FIG. 6B is a cross sectional view taken along a dashed line I2-I2 shown in FIG. 5B.
Figure 6C:
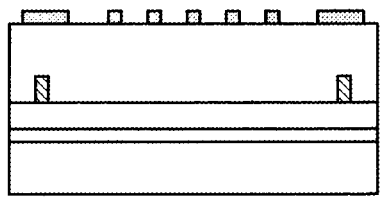
FIG. 6C is a cross sectional view taken along a dashed line I3-I3 shown in FIG. 5C.

FIG. 6A, FIG. 6B and FIG. 6C are cross sectional views taken along dashed lines I1-I1, I2-I2 and I3-I3 respectively shown in FIG. 5A, FIG. 5B and FIG. 5C.

Figure 7A:
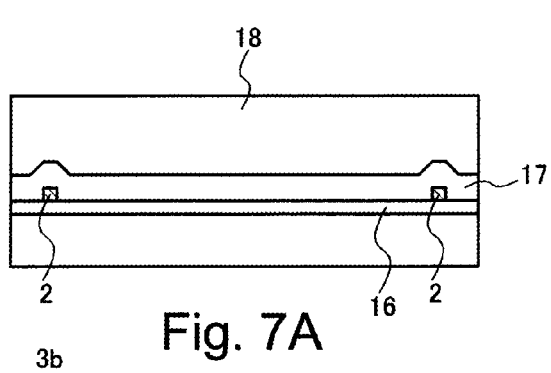
FIG. 7A is a cross sectional view taken along a dashed line II1-II1 shown in FIG. 5A.
Figure 7B:
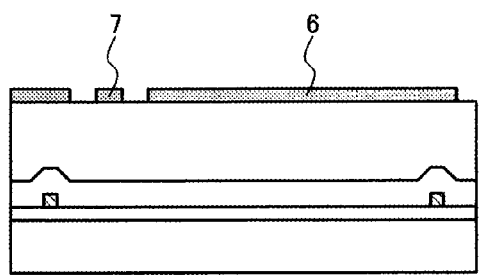
FIG. 7B is a cross sectional view taken along a dashed line II2-II2 shown in FIG. 5B.
Figure 7C:
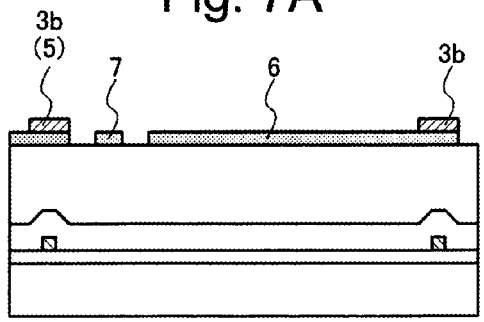
FIG. 7C is a cross sectional view taken along a dashed line II3-II3 shown in FIG. 5C.

FIG. 7A, FIG. 7B and FIG. 7C are cross sectional views taken along dashed lines II1-II1, II2-II2 and II3-II3 respectively shown in FIG. 5A, FIG. 5B and FIG. 5C.

First of all, forming the video signal line 1 so as to be extended into the first direction (vertical direction), and forming the scanning signal line 2 so as to be extended into the second direction (horizontal direction) in order to form a matrix pattern of the pixels, and the TFT 8 is formed at a corner of each pixel. Because it is not important about a forming method of elements associated with the TFT 8 and its driving circuit in the present invention, its description will be omitted.

As shown in FIG. 5A, FIG. 6A and FIG. 7A, the second interlayer insulating film 18 is formed to cover the TFT 8 and driving elements associated with the TFT 8 such as the video signal line 1. The second interlayer insulating film 18 is thick and transparent with the low dielectric constant. Transmittance of an optical light for second interlayer insulating film 18 should be no smaller than 90%, preferably, no smaller than 95%. As for a suitable dielectric constant, it should be no more than 4, desirably, no more than 3. Its thickness is several times of the wiring, such as 0.5~5 μm, desirably, 1~3 μm. As an example of a material satisfying such conditions, there are an organic material such as acrylic, polyamide, polyimide and benzocyclobutene, or inorganic material such as polysiloxane and polysilazane, or resin with organic groups added to them.

The second interlayer insulating film 18 is formed by coating the above mentioned material by using a spin coat method or a slit coat method or the like, and then the coated film is cured by heating it or irradiating ultraviolet rays on it. When silicon nitride or silicon oxide is laminated as a foundation of the film, moisture resistance and gas barrier property can be improved.

Next, the second contact hole 23 is formed in the second interlayer insulating film 18. In a case of using the resin of an ultraviolet cure type, curing and formation of the contact hole can be formed simultaneously by exposing it with a mask. In a case of using thermosetting type film, it is capable to provide a hole by using a dry etching method after forming the pattern of a photo resist (not shown).

Next, as shown in FIG. 5B, FIG. 6B and FIG. 7B, a layer of the first conductor 4 is entirely formed by using such method as a CVD (Chemical Vapor Deposition) method, a sputtering method and a coating method, and then a pattern of the common line 3a, the common electrode 6 and the pixel electrode 7 is formed by a photolithography. As an example of material of the first conductor 4, it is preferable to use transparent conductor such as ITO, AZO (Aluminum doped Zinc Oxide), and GZO (Gallium doped Zinc Oxide). As for the etching, a wet etching or a dry etching can be used. Additionally, a conductive paste dispersed with metallic fine particles can be used.

Next, as shown in FIG. 5C, FIG. 6C and FIG. 7C, a layer of the metal 5 is entirely formed by using such method as a sputtering method and the CVD method. A preferable metal is selected from such metals as Al, Mo, Cr, W, Ti, Ta, Cu, or alloy of those metals or laminated layer of those metals. When a layer of Al is directly formed on the ITO layer, oxidation-reduction reaction tends to occur at a boundary between them. To this end, it is preferable to provide a barrier layer made of such metals as Mo, W, Ti, Ta and Cr between the ITO layer and the Al layer. Next, a resist pattern corresponding to the common line 3b which extends in the second direction is formed by using a photolithography. Next, unnecessary regions of the metal layer are removed by such method as a dry etching and a wet etching such that a pattern of the common line 3b is remained.

Next, an alignment film is formed (not shown). The alignment film has a function that orients molecules of the liquid crystal in a specific direction.

The color layer 20 as a color filter and the black matrix layer 13 are formed on the opposed substrate 12. These layers can be formed by using respective resin which is dispersed with desired color pigments such as red, green, blue, and black. When the resin is given with photosensitivity, a layer of the resin can be patterned by a photolithography. The black matrix 13 are formed so that it may be opposite to the common line 3b formed on the TFT substrate extending along the second direction.

Next, spacers are arranged in a display area, and the TFT substrate 11 and the opposed substrate 12 are bonded together via a sealing material. Bonding process is carried out precisely by using adjustment marks provide on both substrates. However, it is difficult to completely exclude an overlap misalignment due to various factors such as error of a bonding equipment and distortion of the substrates. In this exemplary embodiment, therefore, the black matrix 13 is formed so that its width is slightly wider than that of the metal 5 which is a part of the common line 3b.

Next, liquid crystal is injected through a filler inlet to fill the gap between two substrates, and then the filler inlet is sealed. An LCD device of this exemplary embodiment will be completed in this way.

Exemplary Embodiment 2

Figure 8A:
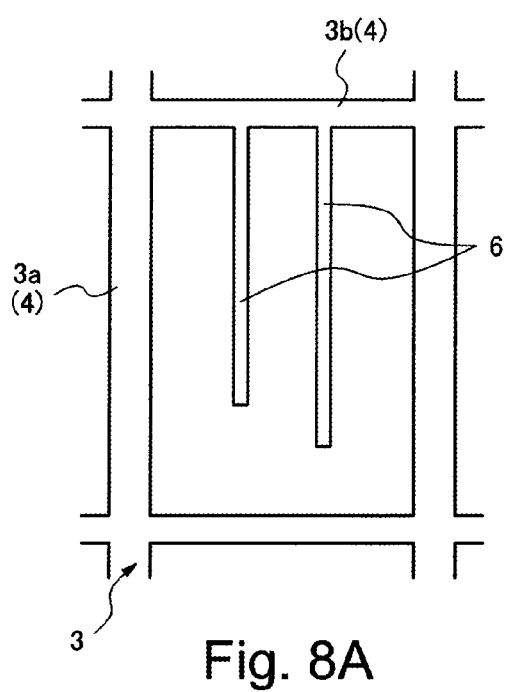
FIG. 8A is a schematic plan view showing an arrangement of a first conductive pattern of the common electrode according to a second exemplary embodiment of the present invention.
Figure 8B:
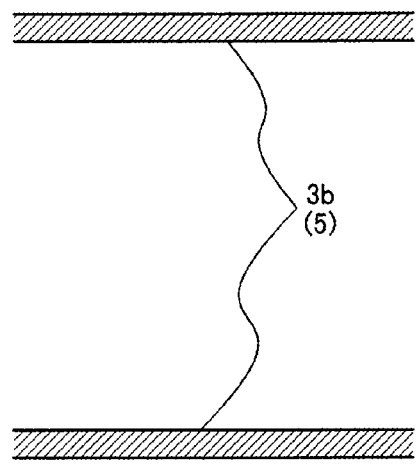
FIG. 8B is a schematic plan view showing an arrangement of a metallic pattern of the common electrode according to the second exemplary embodiment of the present invention.

Next, a second exemplary embodiment of the present invention will be described in detail with reference to drawings. FIG. 8A is a schematic plan view showing an arrangement of a first conductive pattern of a common electrode 3 according to a second exemplary embodiment of the present invention. FIG. 8B is a schematic plan view showing an arrangement of a metallic pattern of the common electrode 3b according to the second exemplary embodiment of the present invention.

In this exemplary embodiment, a latticed common line 3 is formed using the first conductor 4, and then, the common line 3b extending only one direction made of the metal layer 5 is superposed thereon. Resulted structure enables to increase a contact area between the first conductor 4 and the metal layer 5, and thus a contact resistance decreases while its reliability improves.

Exemplary Embodiment 3

Figure 9A:
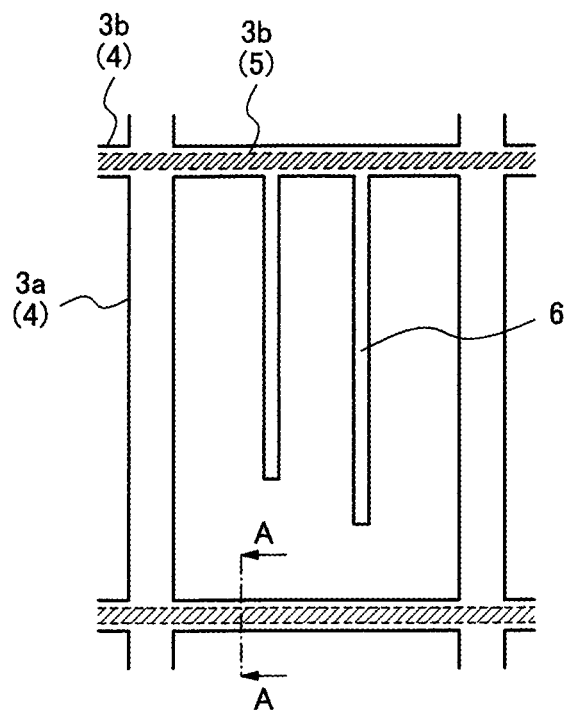
FIG. 9A is a schematic plan view showing an arrangement of a common electrode according to a third exemplary embodiment of the present invention.
Figure 9B:
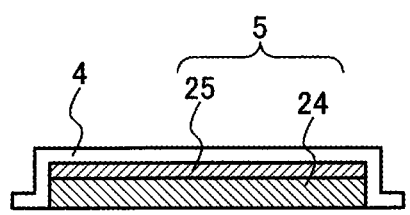
FIG. 9B is a cross sectional view taken along a dashed line IV-IV shown in FIG. 9A.

Next, a third exemplary embodiment of the present invention will be described in detail with reference to the drawings. FIG. 9A is a schematic plan view showing an arrangement of the common electrode 3 according to the third exemplary embodiment of the present invention. FIG. 9B is a cross sectional view taken along a dashed line IV-IV shown in FIG. 9A.

According to this exemplary embodiment, the metal layer 5 and the first conductor 4 are laminated on the first transparent substrate 11 in that order. In this case, the first conductor 4 is formed to cover the metal layer 5 completely in order to prevent corrosion due to a battery reaction during a wet process for patterning the first conductor 4. As an example of the main wiring material 24 of the metal layer 5, Al, Mo, Cr, W, Ti, Ta and Cu can be used. Although such metals include Al and Cu as the main component are suitable because of low resistivity, these metal has a tendency to react at an interface with the first conductor of ITO or the like. For this reason, these metals should laminate a barrier metal 25. As for a suitable material of the barrier metal 25, such metal as Mo, W, Ti, Ta and Cr can be used.

In such structure, because a reflection rate at a surface of the common line 3b can be reduced remarkably, there is no need to provide the black matrix 13 which is provided on the opposed substrate 12 in the first exemplary embodiment. For this reason, aperture ratios can be further improved.

Exemplary Embodiment 4

Next, a fourth exemplary embodiment of the present invention will be described in detail with reference to drawings.

In an LCD device, a peripheral circuit 27 can be fabricated around a display area 26 simultaneously by using a same semiconductor layer 21 used in the display area 26. In this case, the common line 3 can be extended so as to function as a shield against a noise. This is because, in the present invention, the common line 3 is provided on the second interlayer insulating film 18, the common line 3 does not interfere with the video signal line 1 and the scanning signal line 2 whatever kind of layout of the common line 3 is made.

Figure 10A:
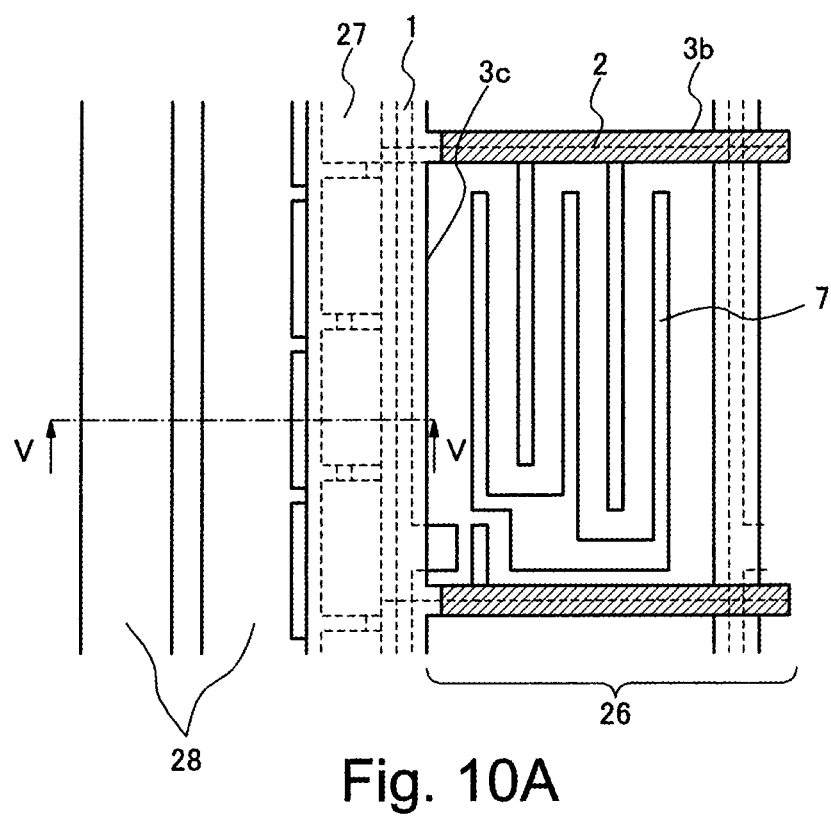
FIG. 10A is a schematic plan view showing a configuration around a TFT substrate according to a fourth exemplary embodiment of the present invention.
Figure 10B:
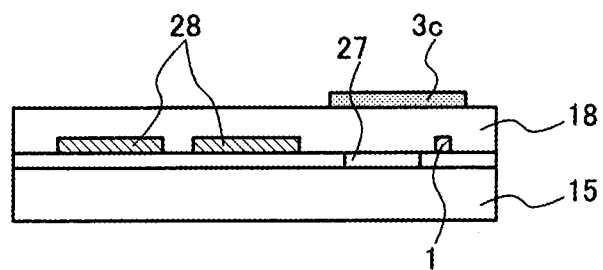
FIG. 10B is a cross sectional view taken along a dashed line V-V shown in FIG. 10A.

FIG. 10A is a schematic plan view showing a configuration around a display area of the LCD device according to a fourth exemplary embodiment of the present invention. FIG. 10B is a cross sectional view taken along a dashed line V-V shown in FIG. 10A.

A peripheral circuit 27 is provided adjacent to a display area 26, and a thick bus wiring 28 is provided outside the peripheral circuit 27 so as to supply such signals as a scanning line signal from an external circuit. The peripheral circuit 27 is covered with the second interlayer insulating film 18, and the common line 3 extends thereon so as to be connected each other for accomplishing a common line connecting portion 3c. This connecting portion 3c shields the peripheral circuit 27 electrically. Regarding the peripheral circuit 27, a gate driver, a data driver, a pre-charging circuit and a power supply circuit can be named as the peripheral circuits.

While the common line connecting portion 3c shields the peripheral circuit 27, it is desirable that it is not superposed on the bus wiring 28. This is because the bus wiring 28 has a wide area and its potential fluctuation is also large, and thus remarkably increasing power consumption owing to charging and discharging of a parasitic capacitance when the shield is provided thereon.

In this structure, because a wiring which connects the common line connecting portion 3c and an external terminal (not shown) is formed on other layer different form the bus wiring 28, a frame-width can be made narrow by an amount of a line width. In FIG. 10A and FIG. 10B, although the common line connecting portion 3c is made with only the first conductor 4, the metal 5 may be extended so as to form a laminated structure of the first conductor 4 and the metal layer 5.

According to this exemplary embodiment, in addition to advantages of the first to third exemplary embodiments mentioned above, noise tolerance improvement of the peripheral circuit and a slimmed frame can be achieved without increasing remarkable power consumption.

Exemplary Embodiment 5

Next, a fifth exemplary embodiment of the present invention will be described in detail with reference to FIG. 11. This exemplary embodiment describes a case when the LCD device mentioned above is applied to various electronic apparatus.

Figure 11:
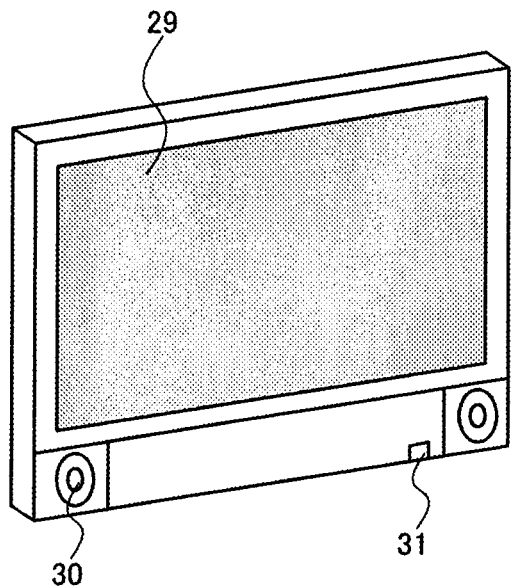
FIG. 11 is a schematic perspective view showing an electronic apparatus according to a fifth exemplary embodiment of the present invention.

FIG. 11 is a perspective view showing an example which applied the LCD device of the first through fourth exemplary embodiments mentioned above to a liquid crystal TV. This liquid crystal TV includes a liquid crystal display panel 29, a pair of speakers 30 and an infrared rays receiving member 31 which receives a manipulating signal from a remote control. Although not being illustrated, a backlight, a control circuit and a receiver are included in the liquid crystal TV.

Exemplary Embodiment 6

Figure 12:
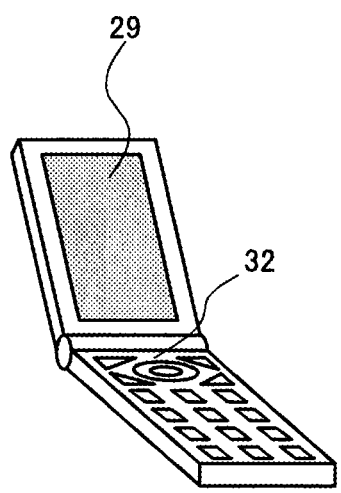
FIG. 12 is a schematic perspective view showing an electronic apparatus according to a sixth exemplary embodiment of the present invention.
Figure 13A:
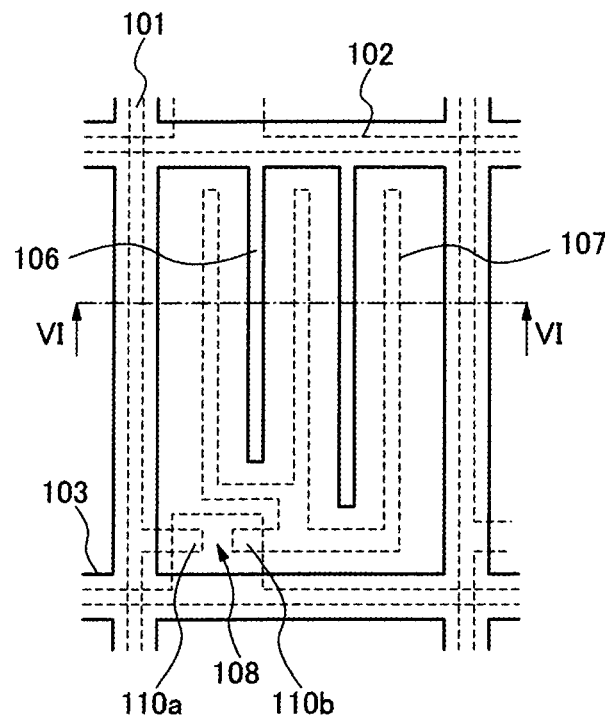
FIG. 13A is a schematic plan view showing a pixel structure according to a related art.
Figure 13B:
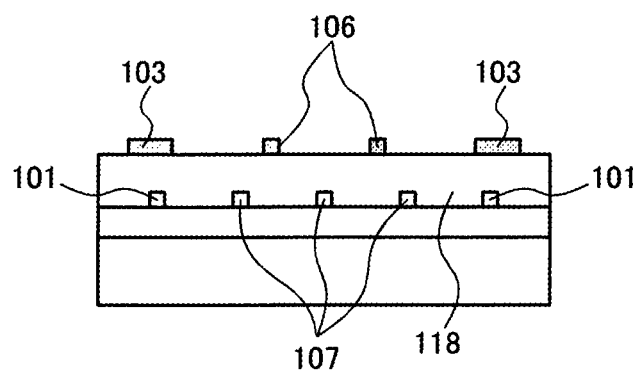
FIG. 13B is a cross sectional view taken along a dashed line VI-VI shown in FIG. 13A.

FIG. 12 is a schematic perspective view showing an electronic apparatus according to a sixth exemplary embodiment of the present invention. FIG. 12 shows an example which applied the LCD device shown in the first through fourth exemplary embodiments mentioned above to a mobile phone. This mobile phone includes a liquid crystal display panel 29 and an operation panel 32. Although not being illustrated, a receiver-transmitter and a calling function or the like are included. Because a compatibility of high-resolution and brightness is required for the mobile phone, it is a worthy example to demonstrate the effective application of the present invention.

As an example of the utilization of the present invention, an LCD device used for a mobile phone, a digital camera, a PC monitor and an LCD television can be listed.

An electronic apparatus according to another aspect of the invention is provided with the LCD device having above stated structure.

According to the LCD device of the present invention and the electronic apparatus using that, following advantages are achieved.

A first advantage of the present invention is capable of reducing reflection of ambient light while maintaining a high aperture ratio.

A second advantage of the present invention is that, in an LCD device with a peripheral circuit integrally formed thereon, received noise at the peripheral circuit can be reduced easily.

A third advantage of the present invention is that, in an LCD device with a peripheral circuit integrally formed thereon, a frame area can be made narrow.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. A liquid crystal display device of a lateral electric field mode comprising:
   a liquid crystal layer sandwiched between a first substrate and a second substrate;
   an array of pixels arranged two-dimensionally on said first substrate in a matrix pattern by crossing a plurality of video signal lines and a plurality of scanning signal lines with each other, each of said pixels being provided with at least a switching element;
   a transparent insulating film provided on said video signal lines and said scanning signal lines;
   a plurality of pixel electrodes provided on said transparent insulating film;
   a plurality of common electrodes provided on said transparent insulating film; and
   a plurality of common lines provided on said transparent insulating film,
   wherein said common lines being formed in a grid-shaped pattern overlap with said plurality of video signal lines and said plurality of scanning lines on said first substrate;
   wherein one direction grid material of said common lines is made of a first conductor having lower reflectivity against optical light than that of a metal layer, while another direction grid material of said common lines extending in other direction is made of a second conductor including the metal layer such that said one direction and the other direction are crossing each other,
   wherein a peripheral circuit using a same semiconductor layer disposed in a display area is provided around said display area, and a conductor extended from said common line covers a part of said peripheral circuit with said transparent insulating film interposed therebetween, a part of said peripheral circuit is a signal processing circuit.

* * * * *